US010331581B2

(12) United States Patent
Dropps et al.

(10) Patent No.: US 10,331,581 B2
(45) Date of Patent: Jun. 25, 2019

(54) VIRTUAL CHANNEL AND RESOURCE ASSIGNMENT

(71) Applicant: HEWLETT PACKARD ENTERPRISE DEVELOPMENT LP, Houston, TX (US)

(72) Inventors: Frank R. Dropps, Maple Grove, MN (US); Michael E. Malewicki, Eau Claire, WI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 102 days.

(21) Appl. No.: 15/483,880

(22) Filed: Apr. 10, 2017

(65) Prior Publication Data
US 2018/0293184 A1 Oct. 11, 2018

(51) Int. Cl.
*G06F 12/08* (2016.01)
*G06F 13/16* (2006.01)
*G06F 13/40* (2006.01)

(52) U.S. Cl.
CPC ........ *G06F 13/161* (2013.01); *G06F 13/1663* (2013.01); *G06F 13/1673* (2013.01); *G06F 13/4022* (2013.01); *G06F 13/4068* (2013.01)

(58) Field of Classification Search
None
See application file for complete search history.

(56) References Cited

U.S. PATENT DOCUMENTS

| 7,222,224 | B2 | 5/2007 | Woo et al. | |
|---|---|---|---|---|
| 8,291,126 | B2 | 10/2012 | Zitlaw | |
| 8,458,405 | B2 | 6/2013 | Bronson et al. | |
| 9,754,648 | B2 | 9/2017 | Mirichigni et al. | |
| 2014/0122829 | A1* | 5/2014 | Barrow-Williams | G06F 12/08 711/207 |
| 2015/0134714 | A1* | 5/2015 | Liao | G06T 1/60 708/250 |
| 2015/0195215 | A1* | 7/2015 | Cudak | H04L 47/72 370/400 |
| 2016/0267025 | A1* | 9/2016 | Makineedi | G06F 12/1458 |
| 2017/0180507 | A1* | 6/2017 | Thierry | H04L 47/70 |
| 2017/0185132 | A1* | 6/2017 | Bodas | G06F 1/3206 |

* cited by examiner

*Primary Examiner* — Hyun Nam
(74) *Attorney, Agent, or Firm* — Mannava & Kang, P.C.

(57) ABSTRACT

A high-performance computing system, method, and storage medium manage accesses to multiple memory modules of a computing node, the modules having different access latencies. The node allocates its resources into pools according to pre-determined memory access criteria. When another computing node requests a memory access, the node determines whether the request satisfies any of the criteria. If so, the associated pool of resources is selected for servicing the request; if not, a default pool is selected. The node then services the request if the pool of resources is sufficient. Otherwise, various error handling processes are performed. Each memory access criterion may relate to a memory address range assigned to a memory module, a type of request, a relationship between the nodes, a configuration of the requesting node, or a combination of these.

31 Claims, 4 Drawing Sheets

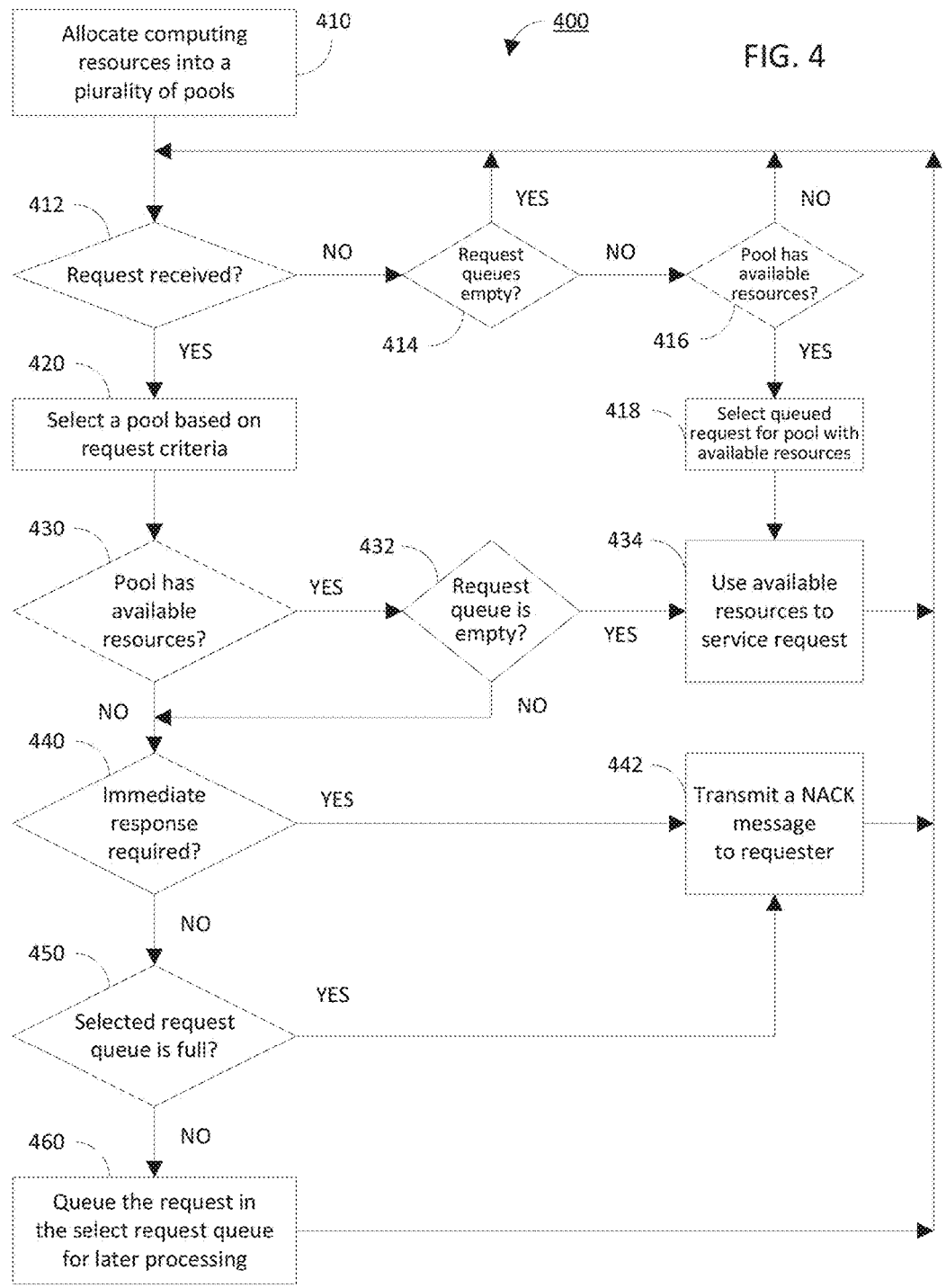

VIRTUAL CHANNEL AND RESOURCE ASSIGNMENT

FIELD OF THE INVENTION

The invention relates generally to internode communication in a high-performance computing system having a mixture of memory latencies and, more particularly, to managing requests by one node in the high-performance computing system to access the memory of another node.

BACKGROUND OF THE INVENTION

A typical high-performance computing (HPC) system, sometimes referred to as a "supercomputer", has a large number of nodes that cooperate to perform computations by sharing memory and communicating data with each other. Each node has specialized hardware that has capabilities similar to a high-end server computer. HPC systems achieve computational performance that is much greater than retail devices such as desktop computers. Performance may be increased in one of two general ways: by improving the technology of the underlying hardware (scaling "up"), or by increasing the quantity of hardware, such as number of processors or amount of memory (scaling "out"). Most HPC systems balance the two types of scaling to achieve maximum performance for the least price. Whatever the balance may be, for ease of system administration the majority of nodes in an HPC system usually have identical hardware and configuration, although a small number of nodes may differ according to the needs of the system users.

One architectural goal in such a shared memory system is to provide uniform latencies (delays) when one node accesses the memory of another, remote node (e.g., for storing data or for reading stored data). That is, the goal is to design the system such that each access to remote memory takes about the same amount of time. When the distribution of memory access latencies is narrow, different messages between nodes can share resources without significant performance impacts. Uniform memory access latencies can be accomplished, while scaling the system out to a reasonable amount of memory, by installing in each node identical dual in-line memory modules (DIMMs), each DIMM capable of storing the same amount of dynamic random-access memory (DRAM).

A DRAM can be thought of as a rectangular array having many rows and columns of words, each word being a fixed number of (e.g. 32 or 64) bits and having a row address and a column address. To access a word in memory, a computing device first presents to the DRAM a signal encoding the row address, which activates all bits on that row for reading and writing; this row activation incurs a first latency. Next, the computing device presents to the DRAM a signal encoding the column address, which connects the correct, already active, bits of the word to the output; this column selection incurs a second latency. Once a row is active, multiple words in different columns may be read without incurring an additional row activation latency, so accessing the first word in a new row is typically slower than accessing the second word and subsequent words in the same row. For example, a typical memory module (DDR4-4000 SDRAM) has a latency of about 9.5 nanoseconds (ns) from receiving a read command to presenting a first word at its output, but a latency of only about 0.25 ns to present each successive word from the same row. Representing 0.25 ns as a frequency, once a row is active this module can perform 4000 "mega transfers" (i.e. 4000 million transfers) per second, as its name suggests.

Uniform memory access times cannot be achieved when the DRAM modules installed in each node have different access latencies. In particular, some HPC system applications benefit from scaling up some of the nodes to include DIMMs that provide non-volatile storage (NVDIMMs) in addition to the volatile DIMMs. When the power to an NVDIMM is disconnected, stored data are retained, and are again accessible when power is restored. Such non-volatile DIMMs may prevent a loss of data due to an unexpected power outage that would require further operation of the HPC system, and may facilitate recovery from a system crash, among other applications. However, a typical NVDIMM may have an access latency between three to nine times slower than a conventional DRAM DIMM. Thus, if a volatile DIMM and a non-volatile DIMM are both present in a remote node, addressable using different memory address ranges, then the latency experienced by a node attempting to access the memory of the remote node will vary drastically as a function of which memory address is requested.

Accessing slower memory (like an NVDIMM) occupies limited resources for longer times than accessing a faster memory (like an ordinary DIMM). When these resources are shared, resource exhaustion by accessing slow memory can prevent uncorrelated accesses to fast memory that otherwise would have completed. In particular, in a computer system with shared memory that is accessed over a data connection between nodes, such as an HPC system, a slower memory access can tie up the connection resources, reducing the speed of all memory accesses that use the connection.

SUMMARY OF VARIOUS EMBODIMENTS

Exemplary embodiments of the invention manage accesses to multiple memory modules (e.g. DIMMs) in a computing node of a high-performance computing (HPC) system, where the modules have different access latencies. This management is accomplished by dividing into pools the available resources for servicing such accesses (such as processor time, data buffers, or bandwidth on an interconnect that is allocated for this purpose). That is, rather than sharing all available resources between all memory accesses, a portion of each resource is allocated to each type of access according to that module's access latency. In particular, a unique association between a memory module and a resource pool may be made using the fact that different memory modules have non-overlapping memory address ranges. More general conditions than memory address ranges also may be used, including a type of access, a relationship between the nodes (for example, a permission relationship), a configuration status of the requesting node, or other conditions. These conditions may be combined, for example using Boolean logic, to form complex memory access criteria.

Thus, a first embodiment of the invention is a high-performance computing (HPC) system comprising a plurality of interconnected computing nodes. In the HPC system, a first computing node in the plurality of computing nodes comprises: a memory that includes a first storage device having a first access latency and a second storage device having a second access latency; a data interface for coupling the computing node to a second computing node in the plurality of computing nodes via an interconnect; and a computing processor coupled to the first storage device, the second storage device, and the data interface.

The computing processors and interconnect are configured to manage accesses to the first computing node's first storage device and the second storage device by the second computing node, by performing several processes. A first such process is allocating resources of the first and second computing nodes and interconnect into a plurality of pools of resources, each such pool containing sufficient resources to service a respective number of pending requests to access the memory of the first computing node according to a respective memory access criterion. A second such process is, in response to receiving, from the second computing node using the interconnect, a data packet that includes a request to access the memory of the first computing node, selecting, for servicing the request, a pool of resources that is either (a) the pool of resources associated with a respective memory access criterion that is satisfied by the request, or (b) a default pool of resources. A third such process is, when the selected pool includes resources sufficient to service the request, servicing the request using those resources.

Variations on the HPC system are contemplated. In a first variant, at least one memory access criterion is a combination of one or more of the group consisting of: a memory address range assigned to either the first storage device or the second storage device, a type of request, a relationship between the first computing node and the second computing node, and a configuration of the second computing node. When the memory access criterion refers to a memory address range, the criterion is satisfied by the request when a memory address contained in the request is within the memory address range. When the memory access criterion refers to a type of request, the criterion is satisfied by the request when the type of request is one of the group consisting of: a coherent data read, a coherent data writeback, a non-coherent data read, a non-coherent data write, a data snoop, an ownership request, a metadata access, and a configuration operation. When the memory access criterion refers to a relationship between the first computing node and the second computing node, the criterion is satisfied by the request when the first computing node or the interconnect determines that the second computing node has permission to access the first computing node's memory. When the memory access criterion refers to a configuration of the second computing node, the criterion is satisfied by the request when the request includes an indication that the second computing node is configured to access memory having varying latencies.

In a second variant, the computing processors or interconnect is further configured so that when the selected pool does not include resources sufficient to service the request, and the request must be immediately processed, the computing processor or interconnect transmits a NACK message to the second computing node using the interconnect. In an extension of this variant, the computing processor or interconnect is further configured so that when the selected pool does not include resources sufficient to service the request, the request need not be immediately processed, and a request queue associated with the selected pool is not full, the computing processor or interconnect (a) queues the request in the request queue until the selected pool includes sufficient resources, and (b) when the selected pool includes sufficient resources, removes the request from the request queue and services the request. In a further extension of this variant, the computing processor or the interconnect is further configured so that when the selected pool does not include resources sufficient to service the request, the request need not be immediately processed, and the request queue is full, the computing processor or interconnect transmits a NACK message to the second computing node using the interconnect. In some variants, the plurality of resources includes, within the interconnect, computing resources, one or more virtual channels, or one or more data buffers. The first storage device, the second storage device, or both of them, may be a DRAM DIMM, NVDIMM, hard disk drive, or solid-state drive.

A second embodiment of the invention provides a method, in an HPC system having a plurality of computing nodes, of managing accesses to a memory of a first such computing node that is coupled to a second computing node in the plurality of computing nodes via an interconnect, the memory consisting of a plurality of storage devices, at least one such storage device having a different access latency than the other such storage devices. The method includes allocating resources of the computing nodes and interconnect into a plurality of pools of resources, each such pool containing sufficient resources to service a respective number of pending requests to access the memory of the first computing node according to a respective memory access criterion. The method also includes, in response to receiving, from the second computing node via the interconnect, a data packet that includes a request to access the memory of the first computing node, selecting a pool of resources that is either (a) the pool of resources associated with a respective memory access criterion that is satisfied by the request, or (b) a default pool of resources. The method further includes, when the selected pool includes resources sufficient to service the request, servicing the request using those resources.

Variations on the method are contemplated. In a first variant, at least one memory access criterion is a combination of one or more of the group consisting of: a memory address range assigned to either the first storage device or the second storage device, a type of request, a relationship between the first computing node and the second computing node, and a configuration of the second computing node. When the memory access criterion refers to a memory address range, the criterion is satisfied by the request when a memory address contained in the request is within the memory address range. When the memory access criterion refers to a type of request, the criterion is satisfied by the request when the type of request is one of the group consisting of: a coherent data read, a coherent data writeback, a non-coherent data read, a non-coherent data write, a data snoop, an ownership request, a metadata access, and a configuration operation. When the memory access criterion refers to a relationship between the first computing node and the second computing node, the criterion is satisfied by the request when the first computing node or interconnect determines that the second computing node has permission to access the memory. When the memory access criterion refers to a configuration of the second computing node, the criterion is satisfied by the request when the request includes an indication that the second computing node is configured to access memory having varying latencies.

In a second variant, when the selected pool does not include resources sufficient to service the request and the request must be immediately processed, the method includes transmitting a NACK message to the second computing node via the interconnect. In an extension of this variant, when the selected pool does not include resources sufficient to service the request, the request need not be immediately processed, and a request queue associated with the selected pool is not full, (a) queuing the request in the request queue until the selected pool includes sufficient resources, and (b) when the selected pool includes sufficient resources, removing the request from the request queue and servicing the request. In a further extension of this variant, when the selected pool does not include resources sufficient to service the request, the request need not be immediately processed, and the request queue is full, the method includes transmitting a NACK message to the second computing node via the interconnect. In some embodiments, the plurality of resources includes, within the interconnect, computing resources, one or more virtual channels, or one or more data buffers.

A third embodiment is a tangible storage medium in which is non-transitorily stored program code that, when executed by a computer processor in a first computing node of a high-performance computing (HPC) system having a plurality of computing nodes, the first computing node being coupled to a second computing node in the plurality of computing nodes via an interconnect, causes the first computing node to perform the above method. Variations on the storage medium are contemplated to perform the above-described variants of the method.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 4 is a flowchart showing exemplary processes for managing accesses to the memory of a node of the HPC system of FIG. 1 according to an embodiment of the invention.

DESCRIPTION OF ILLUSTRATIVE EMBODIMENTS

Figure 1:
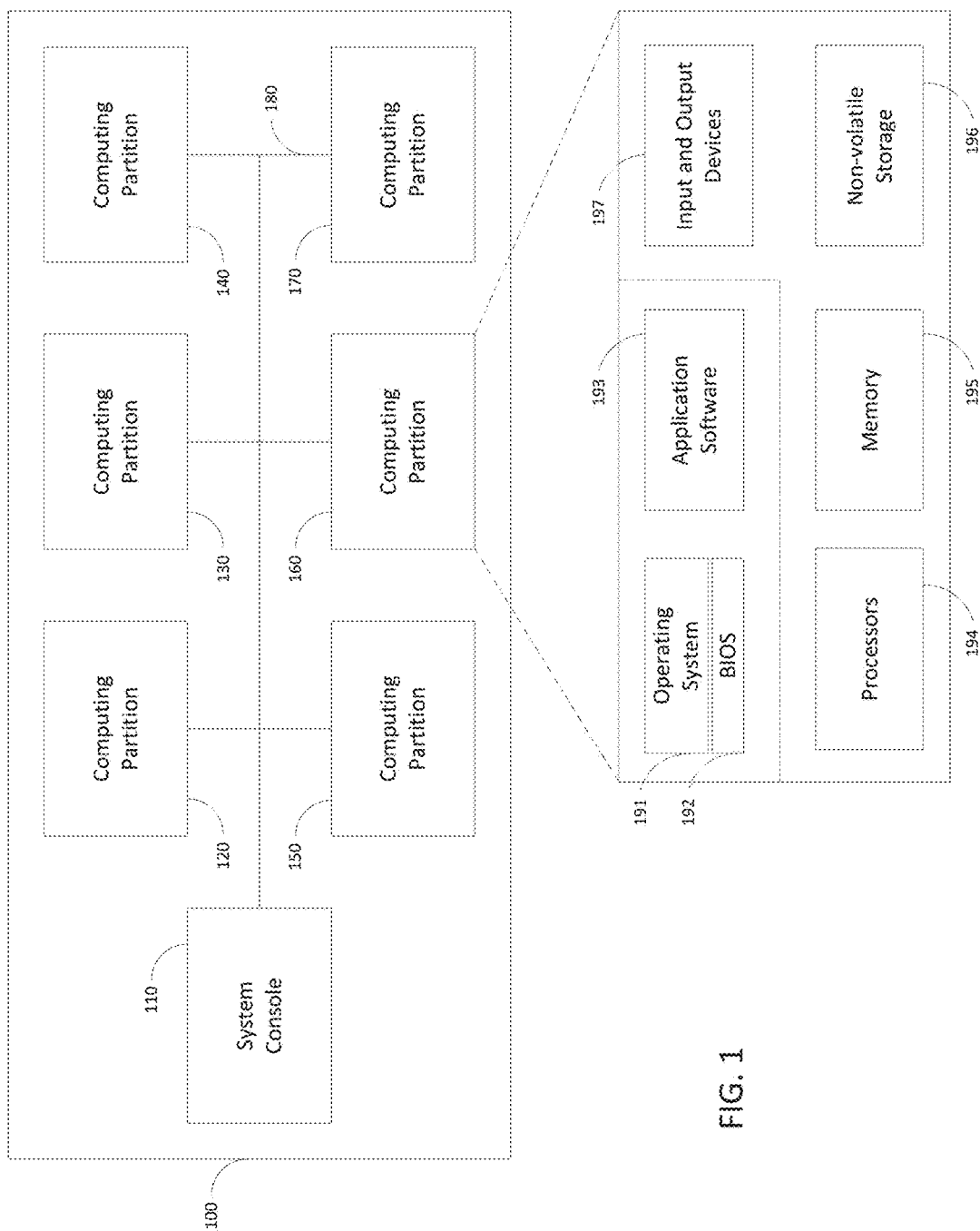
FIG. 1 schematically shows a logical view of an HPC system in accordance with one embodiment of the present invention.

As explained above, various embodiments of the invention manage accesses to multiple memory modules (e.g. DIMMs) in a computing node of a high-performance computing (HPC) system, where the modules have different access latencies. This management is accomplished by dividing into pools the available resources for servicing such accesses (such as processor time, data buffers, or bandwidth on an interconnect that is allocated for this purpose). That is, rather than sharing all available resources between all memory accesses, a node allocates a portion of each resource to each type of access according to that module's access latency. In particular, a unique association between a memory module and a resource pool may be made using the fact that different memory modules have non-overlapping memory address ranges.

Therefore, in some illustrative embodiments, a computing node associates a memory address range and a pool of resources with each memory module. When another computing node requests access to a given memory address, the address is compared to the memory address ranges for each module. If a matching range is found, the pool of resources for accessing the associated memory module is selected for servicing the request. If no matching range is found, a default pool is selected. The node then attempts to service the request using the resources in the selected pool. If the available resources are sufficient, the attempt is successful and the request is serviced. However, if the available resources in the pool are insufficient, the attempt is unsuccessful, and various handling processes are disclosed that may attempt to retry the access at a later time if the circumstances of the request allow.

Other conditions than memory address ranges also may be used, including a type of access, a relationship between the nodes (for example, a permission relationship), a configuration status of the requesting node, or other conditions. These conditions may be combined, for example using Boolean logic, to form complex memory access criteria. Advantageously, embodiments of the invention prevent resource starvation caused by accesses to relatively slow-responding memory modules, by directing different types of memory accesses to different resource pools. Thus, exhaustion of one resource pool only affects one type of memory accesses, allowing other types of memory accesses to continue unabated. As a particularly useful example, memory accesses may be directed to different resource pools based on a requested memory address, which may be pre-assigned to either fast memory or slow memory, so exhaustion of the slow memory resource pool does not prevent access by remote nodes to fast memory.

Details of these and other embodiments are discussed below.

Definitions

As used in this description and the accompanying claims, the following terms shall have the meanings indicated, unless the context otherwise requires:

A "computation" is a physical transformation of input data to output data according to a well-defined model (such as an algorithm). A "computer" or "computer system" is any manufactured device or mechanism that is capable of performing a computation. A "computing process" is any process used by a computer to perform a computation.

A "computing resource" or "resource" is any portion of a computer that may be used to carry out a computing process. Where the context is clear, "resource" also refers to an allocation, for a limited duration, of such a portion of a computer (i.e. time may be treated as a resource).

A "computing processor" is a resource that physically transforms input data to output data, and is programmable to perform different computations by executing a sequence of instructions called a "program". An "executing process" is a collection of resources associated with the execution, by one or more computing processors, of a particularly specified program. The sequence of instructions of a program may be divided into one or more "threads of execution" (or "threads"). A computer that contains a plurality of computing processors is a "multiprocessor computer".

A "memory" is a resource that stores data for use in a computing process. A memory, or portion thereof, is "shared" when it is simultaneously accessible by a plurality of programs, or by a plurality of threads, for use in performing the respective sequences of instructions thereof. To maintain a coherent state of a shared memory (that is, to ensure that changes made by one program or thread are seen by all others), a computer system may use a set of rules for accessing the memory called a "data consistency model", and implement those rules using a "memory coherence protocol".

Multiprocessor computer systems often include memory that is shared between the computing processors. Access to a shared memory in a multiprocessor computer system is called "uniform memory access" or "UMA" (respectively, "non-uniform memory access" or "NUMA") when the time required to complete such access does not depend (respectively, does depend) on which computing processor requested the access.

A computer, or portion thereof, engages in "concurrent computing" when it performs a plurality of simultaneous computations. A single computer may engage in concurrent computing by scheduling the threads of two different programs for execution in consecutive time slots, so that both computations (as a whole) are performed during overlapping windows of time.

A computer engages in "parallel computing" when a plurality of its resources simultaneously cooperate to perform a single or related computing process, in which case the computing process is a "parallel (computing) process". The parallel process is divided into subprocesses, and each of the plurality of resources is allocated to carry out one of the subprocesses. Parallel computing may be equated to concurrent computing to the extent that each such subprocess is treated as a separate computation.

When a parallel process has a plurality of transformations of data that may be independently performed, it has "functional parallelism" and may be divided into subprocesses that each perform a different transformation on the data. When the parallel process operates on a plurality of data that undergo the same transformation, it has "data parallelism" and may be divided into subprocesses that each perform the transformation on different data. A parallel process may have both functional parallelism and data parallelism.

A plurality of computers engages in "distributed computing" when the plurality collectively performs a single computation, in which case the plurality is a "distributed computing system" and the computation is a "distributed computation". A distributed computing system engages in parallel computing, in that collective performance of the distributed computation requires a parallel process that is divided among the collective resources of the distributed computing system. Moreover, a distributed computing system engages in concurrent computing, in that the divided subprocesses (when viewed as separate computations) are performed simultaneously on different resources of the system.

A "high-performance computing system," or "HPC system," is a multiprocessor computing system with shared, coherent memory having non-uniform memory access and a common memory address space, and includes resources that are tightly coupled using hardware interconnects between a plurality of modular units.

A "virtual channel" is a construct of segmenting resources of a physical entity or channel into groups that allow for independent operation with little or no interaction between the groups. These resource may include bandwidth, time slots, receive data buffers, transmit data buffers, other data buffers, flow control tokens and other resources that affect the operation of the physical entity.

System Architecture

FIG. 1 schematically shows a logical view of an exemplary high-performance computing (HPC) system 100 that may be used with illustrative embodiments of the present invention. The HPC system 100 includes a number of logical computing partitions 120, 130, 140, 150, 160, 170 for providing computational resources, and a system console 110 for managing the plurality of partitions 120-170. A "computing partition" (or "partition") in an HPC system is an administrative allocation of computational resources that runs a single operating system instance and has a common memory address space. Partitions 120-170 may communicate with the system console 110 using a logical communication network 180. A system user, such as a scientist or engineer who desires to perform a calculation, may request computational resources from a system operator, who uses the system console 110 to allocate and manage those resources. Allocation of computational resources to partitions is described below. The HPC system 100 may have any number of computing partitions that are administratively assigned as described in more detail below, and often has only one partition that encompasses all of the available resources. Accordingly, this figure should not be seen as limiting the scope of the invention.

Each computing partition, such as partition 160, may be viewed logically as if it were a single computing device, akin to a desktop computer. Thus, the partition 160 may execute software, including a single operating system ("OS") instance 191 that uses a basic input/output system ("BIOS") 192 as these are used together in the art, and application software 193 for one or more system users.

Accordingly, as also shown in FIG. 1, a computing partition has various hardware allocated to it by a system operator, including one or more processors 194, volatile memory 195, non-volatile storage 196, and input and output ("I/O") devices 197 (e.g., network ports, video display devices, keyboards, and the like). However, in HPC systems like the embodiment in FIG. 1, each computing partition has a great deal more processing power and memory than a typical desktop computer. The OS software may include, for example, a Windows® operating system by Microsoft Corporation of Redmond, Wash., or a Linux operating system. Moreover, although the BIOS may be provided as firmware by a hardware manufacturer, such as Intel Corporation of Santa Clara, Calif., it is typically customized according to the needs of the HPC system designer to support high-performance computing, as described below in more detail.

As part of its system management role, the system console 110 acts as an interface between the computing capabilities of the computing partitions 120-170 and the system operator or other computing systems. To that end, the system console 110 issues commands to the HPC system hardware and software on behalf of the system operator that permit, among other things: 1) booting the hardware, 2) dividing the system resources into computing partitions, 3) initializing the partitions, 4) monitoring the health of each partition and any hardware or software errors generated therein, 5) distributing operating systems and application software to the various partitions, 6) causing the operating systems and software to execute, 7) backing up the state of the partition or software therein, 8) shutting down application software, and 9) shutting down a computing partition or the entire HPC system 100. These particular functions are described in more detail in the section below entitled "System Operation."

Figure 2:
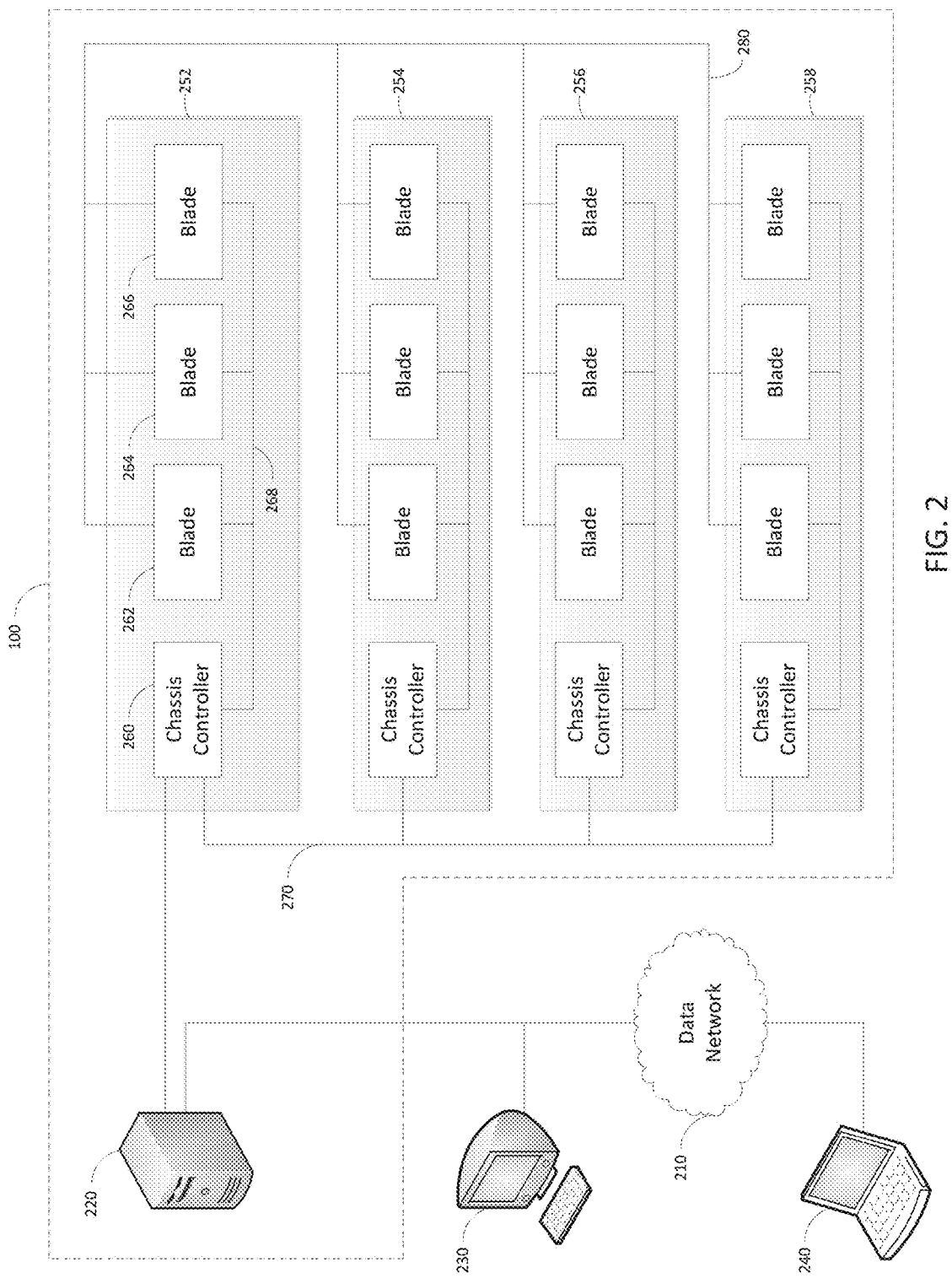
FIG. 2 schematically shows a physical view of the HPC system of FIG. 1.

FIG. 2 schematically shows a physical view of a high performance computing system 100 in accordance with the embodiment of FIG. 1. The hardware that comprises the HPC system 100 of FIG. 1 is surrounded by the dashed line. The HPC system 100 is connected to a customer data network 210 to facilitate customer access.

The HPC system 100 includes a system management node ("SMN") 220 that performs the functions of the system console 110. The management node 220 may be implemented as a desktop computer, a server computer, or other similar computing device, provided either by the customer or the HPC system designer, and includes software necessary to control the HPC system 100 (i.e., the system console software).

The HPC system 100 is accessible using the data network 210, which may include any data network known in the art, such as a customer local area network ("LAN"), a virtual private network ("VPN"), the Internet, or the like, or a combination of these networks. Any of these networks may permit a number of users to access the HPC system resources remotely and/or simultaneously. For example, the management node 220 may be accessed by a customer computer 230 by way of remote login using tools known in the art such as Windows® Remote Desktop Services or the UNIX secure shell. If the customer is so inclined, access to the HPC system 100 may be provided to a remote computer 240. The remote computer 240 may access the HPC system by way of a login to the management node 220 as just described, or using a gateway or proxy system as is known to persons in the art.

The hardware resources of the HPC system 100 (e.g., the processors, memory, non-volatile storage, and I/O devices shown in FIG. 1) are provided collectively by one or more "blade chassis," such as blade chassis 252, 254, 256, 258 shown in FIG. 2, that are managed and allocated into computing partitions. A blade chassis is an electronic chassis that is configured to house, power, and provide high-speed data communications between a plurality of stackable, modular units called "blades." Each blade includes enough computing hardware to act as a standalone computing server. The modular design of a blade chassis permits the blades to be connected to power and data lines with a minimum of cabling and vertical space.

Accordingly, each blade chassis, for example blade chassis 252, has a chassis management controller 260 (also referred to as a "chassis controller" or "CMC") for managing system functions in the blade chassis 252, and a number of blades 262, 264, 266 for providing resources. Each blade, for example blade 262, contributes its hardware resources to the collective total resources of the HPC system 100. The system management node 220 manages the hardware resources of the entire HPC system 100 using the chassis controllers, such as chassis controller 260, while each chassis controller in turn manages the resources for just the blades in its blade chassis. The chassis controller 260 is physically and electrically coupled to the blades 262-266 inside the blade chassis 252 by means of a local management bus 268, described below in more detail. The hardware in the other blade chassis 254-258 is similarly configured.

The chassis controllers communicate with each other using a management connection 270. The management connection 270 may be a high-speed LAN, for example, running an Ethernet communication protocol, or other data bus. By contrast, the blades communicate with each other using a computing connection 280. To that end, the computing connection 280 illustratively has a high-bandwidth, low-latency system interconnect, such as NumaLink, developed by Silicon Graphics International Corp. of Milpitas, Calif.

The chassis controller 260 provides system hardware management functions to the rest of the HPC system. For example, the chassis controller 260 may receive a system boot command from the SMN 220, and respond by issuing boot commands to each of the blades 262-266 using the local management bus 268. Similarly, the chassis controller 260 may receive hardware error data from one or more of the blades 262-266 and store this information for later analysis in combination with error data stored by the other chassis controllers. In some embodiments, such as that shown in FIG. 2, the SMN 220 or a customer computer 230 are provided access to a single, master chassis controller 260 that processes system management commands to control the HPC system 100 and forwards these commands to the other chassis controllers. In other embodiments, however, an SMN 220 is coupled directly to the management connection 270 and issues commands to each chassis controller individually. Persons having ordinary skill in the art may contemplate variations of these designs that permit the same type of functionality, but for clarity only these designs are presented.

The blade chassis 252, its blades 262-266, and the local management bus 268 may be provided as known in the art. However, the chassis controller 260 may be implemented using hardware, firmware, or software provided by the HPC system designer. Each blade provides the HPC system 100 with some quantity of processors, volatile memory, non-volatile storage, and I/O devices that are known in the art of standalone computer servers. However, each blade also has hardware, firmware, and/or software to allow these resources to be grouped together and treated collectively as computing partitions, as described below in more detail in the section entitled "System Operation."

While FIG. 2 shows an HPC system 100 having four chassis and three blades in each chassis, it should be appreciated that these figures do not limit the scope of the invention. An HPC system may have dozens of chassis and hundreds of blades; indeed, HPC systems often are desired because they provide very large quantities of tightly-coupled resources.

Figure 3:
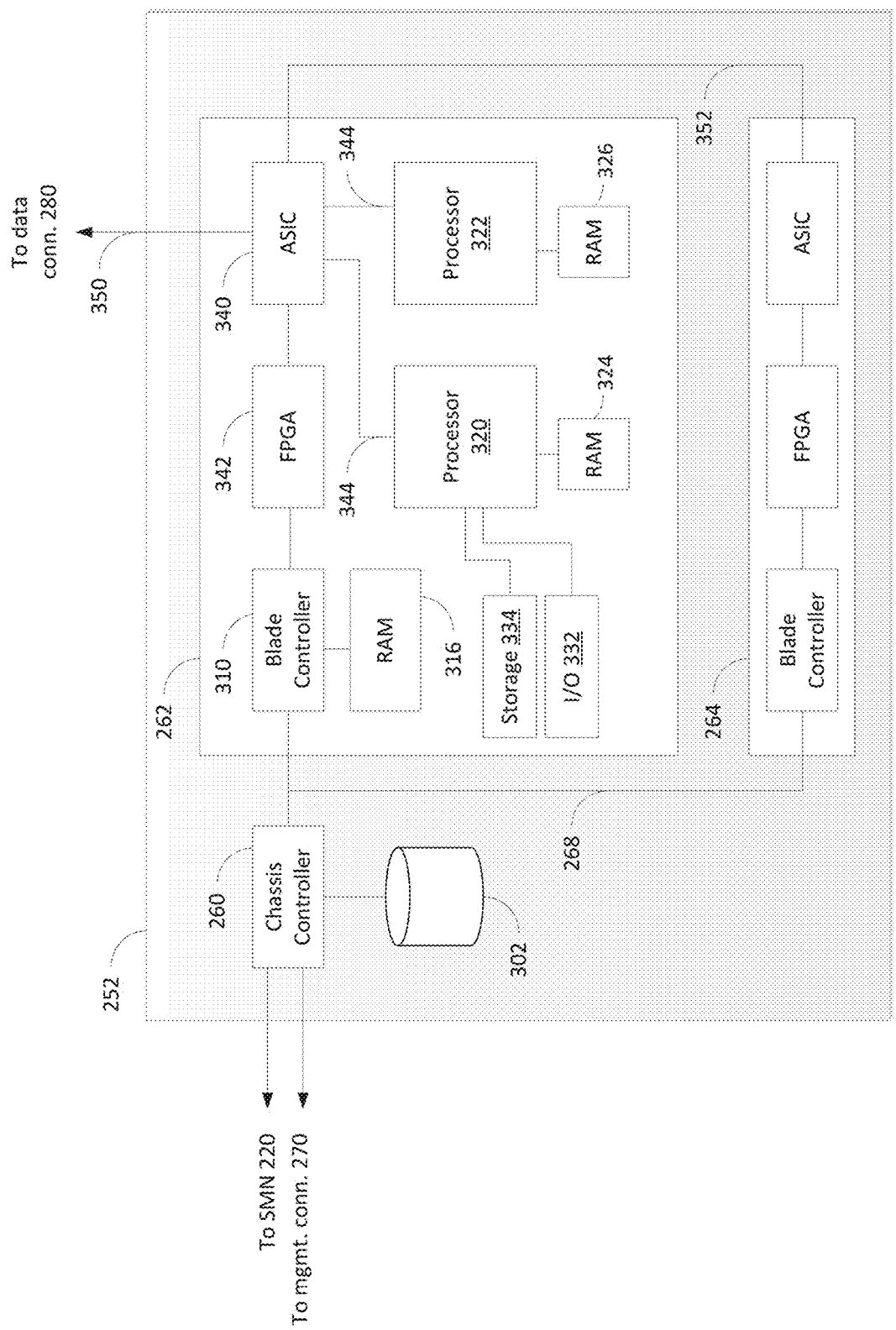
FIG. 3 schematically shows details of a blade chassis of the HPC system of FIG. 1.

FIG. 3 schematically shows a single blade chassis 252 in more detail. In this figure, parts not relevant to the immediate description have been omitted. The chassis controller 260 is shown with its connections to the system management node 220 and to the management connection 270. The chassis controller 260 may be provided with a chassis data store 302 for storing chassis management data. In some embodiments, the chassis data store 302 is volatile random access memory ("RAM"), in which case data in the chassis data store 302 are accessible by the SMN 220 so long as power is applied to the blade chassis 252, even if one or more of the computing partitions has failed (e.g., due to an OS crash) or a blade has malfunctioned. In other embodiments, the chassis data store 302 is non-volatile storage such as a hard disk drive ("HDD") or a solid state drive ("SSD"). In these embodiments, data in the chassis data store 302 are accessible after the HPC system has been powered down and rebooted.

FIG. 3 shows relevant portions of specific implementations of the blades 262 and 264 for discussion purposes. The blade 262 includes a blade management controller 310 (also called a "blade controller" or "BMC") that executes system management functions at a blade level, in a manner analogous to the functions performed by the chassis controller at the chassis level. For more detail on the operations of the chassis controller and blade controller, see the section entitled "HPC System Operation" below. The blade controller 310 may be implemented as custom hardware, designed by the HPC system designer to permit communication with the chassis controller 260. In addition, the blade controller 310 may have its own RAM 316 to carry out its management functions. The chassis controller 260 communicates with the blade controller of each blade using the local management bus 268, as shown in FIG. 3 and the previous figures.

The blade 262 also includes one or more microprocessors 320, 322 (alternatively referred to as "processors 320 or 322" or generically referred to as "processors 320") that are connected to RAM 324, 326. Blade 262 may be alternately configured so that multiple processors may access a common set of RAM on a single bus, as is known in the art. It should also be appreciated that processors 320, 322 may include any number of central processing units ("CPUs") or cores, as is known in the art. The processors 320, 322 in the blade 262 are connected to other items, such as a data bus that communicates with I/O devices 332, a data bus that communicates with non-volatile storage 334, and other buses commonly found in standalone computing systems. (For clarity, FIG. 3 shows only the connections from processor 320 to these other devices.) The processors 320, 322 may be, for example, Intel® Core™ processors manufactured by Intel Corporation. The I/O bus may be, for example, a PCI or PCI Express ("PCIe") bus. The storage bus may be, for example, a SATA, SCSI, or Fibre Channel bus. It will be appreciated that other bus standards, processor types, and processor manufacturers may be used in accordance with illustrative embodiments of the present invention.

Each blade (e.g., the blades 262 and 264) includes an application-specific integrated circuit 340 (also referred to as an "ASIC", "hub chip", or "hub ASIC") that controls much of its functionality. More specifically, to logically connect the processors 320, 322, RAM 324, 326, and other devices 332, 334 together to form a managed, multi-processor, (optionally) coherently-shared distributed-memory HPC system, the processors 320, 322 are electrically connected to the hub ASIC 340. The hub ASIC 340 thus provides an interface between the HPC system management functions generated by the SMN 220, chassis controller 260, and blade controller 310, and the resources of the blade 262.

In this connection, the hub ASIC 340 connects with the blade controller 310 either through a direct connection, or by way of a field-programmable gate array ("FPGA") 342 or similar programmable device for passing signals between integrated circuits. Those skilled in the art can select the appropriate connection between the hub ASIC 340 and the blade controller 310. Discussion of the direct connection or indirect connection should not limit various embodiments of the invention.

In particular, signals are generated on output pins of the blade controller 310, in response to commands issued by the chassis controller 260. In the indirect connection case, these signals are translated by the FPGA 342 into commands for certain input pins of the hub ASIC 340, and vice versa. For example, a "power on" signal received by the blade controller 310 from the chassis controller 260 requires, among other things, providing a "power on" voltage to a certain pin on the hub ASIC 340; the FPGA 342 facilitates this task.

The field-programmable nature of the FPGA 342 permits the interface between the blade controller 310 and ASIC 340 to be reprogrammable after manufacturing. Thus, for example, the blade controller 310 and ASIC 340 may be designed to have certain generic functions, and the FPGA 342 may be used advantageously to program the use of those functions in an application-specific way. The communications interface between the blade controller 310 and ASIC 340 also may be updated if a hardware design error is discovered in either module, permitting a quick system repair without requiring new hardware to be fabricated.

Also in connection with its role as the interface between resources and system management, the hub ASIC 340 is connected to the processors 320, 322 by way of a high-speed processor interconnect 344. In one embodiment, the processors 320, 322 are manufactured by Intel Corporation which provides the Intel® QuickPath Interconnect ("QPI") for this purpose, and the hub ASIC 340 includes a module for communicating with the processors 320, 322 using QPI. Other embodiments may use other processor interconnect configurations.

The hub chip 340 in each blade also provides connections to other blades for high-bandwidth, low-latency data communications. Thus, the hub chip 340 includes a link 350 to the computing connection 280 that connects different blade chassis. This link 350 may be implemented using networking cables, for example. The hub ASIC 340 also includes connections to other blades in the same blade chassis 252. The hub ASIC 340 of blade 262 connects to the hub ASIC 340 of blade 264 by way of a chassis computing connection 352. The chassis computing connection 352 may be implemented as a data bus on a backplane of the blade chassis 252 rather than using networking cables, advantageously allowing the very high speed data communication between blades that is required for high-performance computing tasks. Data communication on both the inter-chassis computing connection 280 and the intra-chassis computing connection 352 may be implemented using the NumaLink protocol or a similar protocol.

HPC System Operation

System management commands generally propagate from the SMN 220, through the management connection 270 to the blade chassis (and their chassis controllers), then to the blades (and their blade controllers), and finally to the hub ASICS that implement the commands using the system computing hardware.

As an example, consider the process of powering on an HPC system. In accordance with exemplary embodiments, the HPC system 100 is powered when a system operator issues a "power on" command from the SMN 220. The SMN 220 propagates this command to each of the blade chassis 252-258 by way of their respective chassis controllers, such as chassis controller 260 in blade chassis 252. Each chassis controller, in turn, issues a "power on" command to each of the respective blades in its blade chassis by way of their respective blade controllers, such as blade controller 310 of blade 262. Blade controller 310 issues a "power on" command to its corresponding hub chip 340 using the FPGA 342, which provides a signal on one of the pins of the hub chip 340 that allows it to initialize. Other commands propagate similarly.

Once the HPC system is powered on, its resources may be divided into computing partitions. The quantity of resources that are allocated to each computing partition is an administrative decision. For example, a customer may have a number of projects to complete, and each project is projected to require a certain amount of resources. Different projects may require different proportions of processing power, memory, and I/O device usage, and different blades may have different quantities of the resources installed. The HPC system administrator takes these considerations into account when partitioning the resources of the HPC system 100. Partitioning the resources may be accomplished by programming each blade's RAM 316. For example, the SMN 220 may issue appropriate blade programming commands after reading a system configuration file.

The collective hardware resources of the HPC system 100 may be divided into computing partitions according to any administrative need. Thus, for example, a single computing partition may include the resources of some or all of the blades of one blade chassis 252, all of the blades of multiple blade chassis 252 and 254, some of the blades of one blade chassis 252 and all of the blades of blade chassis 254, all of the resources of the entire HPC system 100, and other similar combinations. Hardware resources may be partitioned statically, in which case a reboot of the entire HPC system 100 is required to reallocate hardware. Alternatively and preferentially, hardware resources are partitioned dynamically while the HPC system 100 is powered on. In this way, unallocated resources may be assigned to a partition without interrupting the operation of other partitions.

It should be noted that once the HPC system 100 has been appropriately partitioned, each partition may be considered to act as a standalone computing system. Thus, two or more partitions may be combined to form a logical computing group inside the HPC system 100. Such grouping may be necessary if, for example, a particular computational task is allocated more processors or memory than a single operating system can control. For example, if a single operating system can control only 64 processors, but a particular computational task requires the combined power of 256 processors, then four partitions may be allocated to the task in such a group. This grouping may be accomplished using techniques known in the art, such as installing the same software on each computing partition and providing the partitions with a VPN.

Once at least one partition has been created, the partition may be booted and its resources initialized. Each computing partition, such as partition 160, may be viewed logically as having a single OS 191 and a single BIOS 192. As is known in the art, BIOS is a collection of instructions that electrically probes and initializes the available hardware to a known state so that the OS can boot, and is typically provided in a firmware chip on each physical server. However, a single logical computing partition 160 may span several blades, or even several blade chassis. A blade may be referred to as a "computing node" or simply a "node" to emphasize its allocation to a particular partition.

Booting a partition in accordance with an embodiment of the invention requires a number of modifications to be made to a blade chassis that is purchased from stock. In particular, the BIOS in each blade are modified to determine other hardware resources in the same computing partition, not just those in the same blade or blade chassis. After a boot command has been issued by the SMN 220, the hub ASIC 340 eventually provides an appropriate signal to the processor 320 to begin the boot process using BIOS instructions. The BIOS instructions, in turn, obtain partition information from the hub ASIC 340 such as: an identification (node) number in the partition, a node interconnection topology, a list of devices that are present in other nodes in the partition, a master clock signal used by all nodes in the partition, and so on. Armed with this information, the processor 320 may take whatever steps are required to initialize the blade 262, including 1) non-HPC-specific steps such as initializing I/O devices 332 and non-volatile storage 334, and 2) also HPC-specific steps such as synchronizing a local hardware clock to a master clock signal, initializing HPC-specialized hardware in a given node, managing a memory directory that includes information about which other nodes in the partition have accessed its RAM, and preparing a partition-wide physical memory map.

At this point, each physical BIOS has its own view of the partition, and all of the resources in each node are prepared for the OS to load. The BIOS then reads the OS image and executes it, in accordance with techniques known in the art of multiprocessor systems. The BIOS presents to the OS a view of the partition hardware as if it were all present in a single, very large computing device, even if the hardware itself is scattered among multiple blade chassis and blades. In this way, a single OS instance spreads itself across some, or preferably all, of the blade chassis and blades that are assigned to its partition. Different operating systems may be installed on the various partitions. If an OS image is not present, for example immediately after a partition is created, the OS image may be installed using processes known in the art before the partition boots.

Once the OS is safely executing, its partition may be operated as a single logical computing device. Software for carrying out desired computations may be installed to the various partitions by the HPC system operator. Users may then log into the SMN 220. Access to their respective partitions from the SMN 220 may be controlled using volume mounting and directory permissions based on login credentials, for example. The system operator may monitor the health of each partition, and take remedial steps when a hardware or software error is detected. The current state of long-running application programs may be saved to non-volatile storage, either periodically or on the command of the system operator or application user, to guard against losing work in the event of a system or application crash. The system operator or a system user may issue a command to shut down application software. Other operations of an HPC partition may be known to a person having ordinary skill in the art. When administratively required, the system operator may shut down a computing partition entirely, reallocate or deallocate resources in a partition, or power down the entire HPC system 100.

Management of Requests to Access Remote Resources Having Different Latencies

For purposes of this disclosure, a "virtual channel" between two nodes is a logical networking construct that presents a sharing of a physical communication link between the two nodes, when in fact the communication path between the two nodes may pass through any number of other, intermediate nodes using different physical media (e.g., networking cables) in a complex interconnect fabric. A virtual channel may use both dedicated and shared resources.

In accordance with illustrated embodiments of the invention, an HPC system 100, method 400 (shown in FIG. 4), and storage medium manage accesses to multiple memory modules (e.g. a RAM 324 taken to be volatile, and a RAM 326 taken to be non-volatile) of a computing node 262, the modules 324, 326 having different access latencies. The node 262 allocates its resources into pools according to pre-determined memory access criteria. The resources may be, for example: the processors 320, 322 (including time slots for thread scheduling thereon), portions of RAM 324, 326 and non-volatile storage 334 needed to implement memory access, portions of the resources of the ASIC 340, and one or more virtual channels on link 350 or chassis computing connection 352 that allow other nodes (such as node 264) to contact the node 262, and other such resources. It should be appreciated that resources may be allocated into any number of pools, to suit any desired granularity of configuration. Thus, embodiments of the invention support the use of any number of memory modules, having any number of different latencies.

The node 262 also assigns non-overlapping memory address ranges to the memory modules according to their latencies. For example, data that are often accessed may be placed in the volatile RAM 324, which has a lower access latency, while data that are not as often accessed but must be preserved against unexpected power failure (such as the result of an intermediate computation) may be placed in the non-volatile RAM 326. In this way, data are stored in a memory according to an optimal pattern.

In the simplest embodiment, when a second computing node (say node 264) requests access to a given memory address of the first node 262, the node 262 determines the memory address range to which the given memory address belongs, and thereby determines which memory module 324, 326 holds the requested data. The first node 262 then determines the pool of resources allocated to that memory latency grouping or group of modules with similar latencies. The node 262 then services the request if the pool contains enough available resources. Otherwise, various contingency handling processes are performed.

These processes are illustrated in FIG. 4, which is a flowchart showing exemplary processes for a method 400 of managing accesses to the memory of a node of an HPC system according to an embodiment of the invention. The method 400 begins with a process 410 in which a computing node, such as node 262, configures itself to receive requests for memory accesses by allocating its resources into a plurality of pools. For example, it might allocate one resource pool to the fast, volatile memory 324 and another resource pool to the slow, non-volatile memory 326. Since these two memories 324, 326 have non-overlapping address ranges, the pools could be referenced using the starting address in a global memory address space of each such memory.

A condition other than a memory address range that might form part of an allocation criterion is a relationship between the two nodes. For example, the remote node may have read permission but not write permission for a certain range of local memory addresses, and full write permission for a different range of addresses. Or, if the remote node is not assigned to the same partition as the local node 262, for security reasons the remote node may have no permission at all to read data stored in node 262, regardless the memory device in which they are stored.

In some heterogeneous embodiments, some nodes in the HPC system may have memories with mixed latencies, while other nodes do not. This may be the case when the HPC system owner is in the middle of upgrading the system (by scaling up). If so, some nodes may be able to process wide variation in remote memory access times, while others may not. Therefore, another condition that might be used is a flag in the request, indicating that the remote node is configured to access memory with varying latencies.

Still other criteria could be used, such as a type of the access request. For example, the node 262 might be configured so that all requests from other nodes to read the memory of node 262 (regardless of the memory module in which the data are stored) use a default pool of resources, under the assumption that this pool cannot be exhausted according to the parameters of the particular computation in which the node is participating. However, the node 262 might be further configured so that requests from other nodes to write data into the memory of node 262 are allocated to resource pools on the basis of the requested memory address. Thus, the criteria associated with each pool may be a combination of conditions—in this case, a combination of a request type (read or write) with a memory address range assigned to one of the memory devices 324, 326. Other types of requests that might be assigned to resource pools are defined by the cache coherence protocol, and include, without limitation: coherent data read requests, coherent data write-back requests, non-coherent data read requests, non-coherent data write requests, data snoop requests, and any other request or command from another node that requires the local node 262 to access its memory.

In general, a memory access criterion may be a combination (e.g. using Boolean logical operators, such as AND, OR, XOR, NOT, and so on) of any or all of the conditions described herein. The ability to combine conditions to form complex memory access criteria permits embodiments of the invention to provide fine-grained allocation of memory access requests to resource pools. Thus, the node 262 may advertise to the other nodes of the HPC system 100 (through means beyond the scope of this disclosure) that a certain range of memory addresses has a faster write access time (i.e., lower latency) than a certain other range of memory addresses, and it may implement this advertisement using an embodiment of the present invention in a manner less likely to cause resource exhaustion than in the prior art.

The choice of which resources, and how much or how many of them, to allocate to a particular resource pool may be made using any reasonable heuristic. For example, the node 262 may be programmed (e.g. using the system management node 220) to devote three times as many resources to non-volatile RAM 326 as to volatile RAM 324, if the former has an access latency that is three times the length of the latter. In support of this requirement, the node 262 may configure or assign four virtual channels to a given remote node, assign three of them to the resource pool for RAM 326 and the last one of them to the resource pool for RAM 324. Other resources of the node 262 may be allocated to pools in a similar manner.

Once the initial allocation of resources in process 410 is complete, the method enters a loop in which memory access requests are received and processed. If sufficient resources to process a request is not available, the method 400 attempts to queue the request for later processing, if such later processing is permitted by the requester. Such a request queue may be implemented as a first-in, first-out (FIFO) queue, so that memory access requests are processed by the node 262 in the order in which they were received. In other embodiments, a different mechanism may be used, such as a last-in, first-out (LIFO) queue (also called a "stack"), or a random access queue. These other mechanisms may be useful to address particular quirks of the computation in which the node 262 is participating. It should be appreciated that the use of a queue to track pending requests does not limit the invention, and that each virtual channel may have separate request queues.

The loop begins in process 412, in which an analysis is performed to determine whether a new request has been received. If a new request has been received, the method 400 moves to process 420, in which new requests are processed as described below in more detail. However, if no new request has been received, the method 400 proceeds to process 414, which begins a subprocess that attempts to service requests that have already been queued. This subprocess is now described.

In process 414, an analysis is performed to determine whether any of the uncompleted requests reside in one of the request queues. If there are no requests pending in a request queue, there is nothing further to be done, so the method 400 proceeds back to process 412. However, if there are currently uncompleted requests pending in a request queue, the method 400 proceeds to process 416.

In process 416, an analysis is performed to determine whether a pool of resources is available corresponding to a request in a request queue, as described in detail below in connection with process 420. If the required resources are not available, then the request is pending but cannot be serviced. If no pending request can be serviced, the method 400 proceeds back to process 412. However, if the required resources are available to service a pending request, the method 400 proceeds to process 418. In process 418, the uncompleted pending request is removed from the relevant request queue, and the method 400 advances to process 434 for processing the pending request using available resources, as described below in more detail.

Processing of new requests is now described. In process 420, after a memory access request has been received, the node 262 selects a resource pool to service the request, on the basis of the memory access criteria discussed above. Selection can be implemented simply, for example by providing a list of functions, one for each criterion, that operated on the request data (and perhaps also its metadata), and system-wide or partition-wide information, to produce a yes-or-no output that indicates whether the associated resource pool should be used. If the allocation criteria are mutually exclusive, then at most one such function should produce a "yes" output. If the allocation criteria exhaust all possible selection inputs, then at least one such function should produce a "yes" output. If the criteria are not exhaustive, it is possible to receive a memory access request for which none of the functions produces a "yes" output, in which case a default resource pool is selected.

In process 430, the selected resource pool is analyzed to determine whether it has sufficient available resources to process the memory access request. This analysis may be done using techniques known in the art. For example, if three virtual channels are assigned to a resource pool for a non-volatile memory, the node 262 may maintain a data structure that indicates which of these channels are presently available. If none are available, then sufficient resources are not available to process another request, and the method 400 proceeds to process 440 to attempt delayed processing as described below. However, if sufficient resources are available, the method proceeds to process 432.

In process 432, an analysis is performed to determine whether the corresponding request queue is empty. The correspondence is made between the selected resource pool from process 420 and the matching request queue. If the request queue is not empty, then there are available resources to service the request but another request is already pending that can use those resources. The pending request should be serviced first, to avoid concurrency problems. Therefore, the new request cannot be immediately processed, and the method 400 proceeds to process 440. However, if the request queue for the selected pool is empty, the method 400 proceeds to process 434, in which the node 262 services the memory access request using available resources.

Process 434 for servicing the request may require several steps. Available virtual channel resources are selected, for example from a data structure that indicates which virtual channels have available resources. This data structure may be maintained in the node 262, or in another location in the HPC system. Once process 434 reserves virtual channel resources, it updates the data structure to indicate that some of its resources are now unavailable. Process 434 also includes processing the request using the selected virtual channel, and upon completion, updating the data structure to indicate that the reserved virtual channel resources are now available. If other resources are required to service the request, process 434 performs similar actions for all of the other resources. Once the given request has been serviced, the method 400 returns to process 412, to service another new or pending request.

If the selected resource pool does not include sufficient available resources, or if there is already a pending request, the method 400 attempts to process the new request at a later time. However, this may not be possible. For example, some memory access requests must be completed immediately, whether they succeed or fail. Therefore, in process 440, the node 262 determines whether the request requires an immediate response. This determination may be made using techniques known in the art, and may be based, for example, on the type of request, or on a flag set in the data of the request itself. If the request requires an immediate response, then the request must be rejected. Thus, the method advances to process 442, in which the node 262 transmits to the requesting node a non-acknowledgement ("NACK") message, indicating that the request could not be fulfilled.

Alternately, if the request does not require an immediate response, then the possibility remains to fulfill the request as soon as the required resources become available. In this case, a request queue is used to keep track of waiting requests for each resource pool. Thus, for requests that are permitted to wait for completion, the method 400 advances to process 450, in which the node 262 determines whether the request queue for the selected resource pool has reached its maximum capacity. This may be done using techniques known in the art of managing data structures such as queues. Ideally, if the resources have been properly allocated to pools and the request queue is properly sized, this should never happen. However, if the request queue is full, then the memory access request cannot be tracked for future fulfillment, so the method 400 advances to process 442 and the node 262 transmits a NACK message to the requesting remote node.

If the request queue is not full (which should usually be the case), then the method advances to process 460, in which the node 262 queues the memory access request in the request queue. When the selected resource pool once again has sufficient resources to process the request, the request will be serviced. For example, the monitoring process may be event driven, or the process 434 for servicing the request may include a comparison of available resources against the request queue as it completes.

After each of processes 434 (servicing a memory access request), 442 (transmitting a NACK because the request could not be serviced), and 460 (queuing the request for later fulfillment), the method 400 as shown returns to process 412. It should be appreciated that the method 400 may include other, routine tasks associated with managing memory access requests, such as maintenance of data structures or checks of hardware health, without departing from the scope of the invention.

Although the above discussion discloses various exemplary embodiments of the invention, it should be apparent that those skilled in the art can make various modifications that will achieve some of the advantages of the invention without departing from the true scope of the invention.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

What is claimed is:

1. A high-performance computing (HPC) system comprising a plurality of interconnected computing nodes, wherein a first computing node in the plurality of computing nodes comprises:
a memory that includes a first storage device having a first access latency and a second storage device having a second access latency;
a data interface for coupling the first computing node to a second computing node in the plurality of computing nodes via an interconnect; and
a computing processor, coupled to the first storage device, the second storage device, and the data interface, the computing processor and the interconnect being configured to manage accesses to the memory by the second computing node by:
allocating resources of the first and second computing nodes and the interconnect into a plurality of pools of resources, each such pool containing sufficient resources to service a respective number of pending requests to access the memory of the first computing node according to a respective memory access criterion;
in response to receiving, from the second computing node using the interconnect, a data packet that includes a request to access the memory of the first computing node, selecting, for servicing the request, a pool of resources that is either (a) the pool of resources for a respective memory access criterion that is satisfied by the request, or (b) a default pool of resources; and
when the selected pool includes resources sufficient to service the request, servicing the request using those resources.

2. The HPC system according to claim 1, wherein at least one memory access criterion is a combination of one or more of the group consisting of: a memory address range assigned to either the first storage device or the second storage device, a type of request, a relationship between the first computing node and the second computing node, and a configuration of the second computing node.

3. The HPC system according to claim 2, wherein the at least one memory access criterion refers to a memory address range, and the criterion is satisfied by the request when a memory address contained in the request is within the memory address range.

4. The HPC system according to claim 2, wherein the at least one memory access criterion refers to a type of request, and the criterion is satisfied by the request when the type of request is one of the group consisting of: a coherent data read, a coherent data write-back, a non-coherent data read, a non-coherent data write, a data snoop, an ownership request, a metadata access, and a configuration operation.

5. The HPC system according to claim 2, wherein the at least one memory access criterion refers to a relationship between the first computing node and the second computing node, and the criterion is satisfied by the request when the first computing node or the interconnect determines that the second computing node has permission to access the memory of the first computing node.

6. The HPC system according to claim 2, wherein the at least one memory access criterion refers to a configuration of the second computing node, and the criterion is satisfied by the request when the request includes an indication that the second computing node is configured to access memory having varying latencies.

7. The HPC system according to claim 1, wherein the computing processor or the interconnect is further configured so that when the selected pool does not include resources sufficient to service the request:
when the request must be immediately processed, the computing processor or the interconnect transmits a NACK message to the second computing node using the interconnect.

8. The HPC system according to claim 7, wherein the computing processor or the interconnect is further configured so that when the selected pool does not include resources sufficient to service the request and the request need not be immediately processed:
when a request queue for the selected pool is not full, the computing processor or the interconnect (a) queues the request in the request queue until the selected pool includes sufficient resources, and (b) when the selected pool includes sufficient resources, removes the request from the request queue and services the request.

9. The HPC system according to claim 8, wherein the computing processor or the interconnect is further configured so that when the selected pool does not include resources sufficient to service the request, the request need not be immediately processed, and the request queue is full:
the computing processor or the interconnect transmits a NACK message to the second computing node.

10. The HPC system according to claim 1, wherein the plurality of resources includes, within the interconnect, computing resources, one or more virtual channels, or one or more data buffers.

11. The HPC system according to claim 1, wherein the first storage device, the second storage device, or both of them, is a DRAM DIMM, NVDIMM, hard disk drive, or solid-state drive.

12. A method, in a high-performance computing (HPC) system having a plurality of computing nodes, of managing accesses to a memory of a first such computing node that is coupled to a second computing node in the plurality of computing nodes via an interconnect, the memory consisting of a plurality of storage devices, at least one such storage device having a different access latency than the other such storage devices, the method comprising:

allocating resources of the first and second computing nodes and the interconnect into a plurality of pools of resources, each such pool containing sufficient resources to service a respective number of pending requests to access the memory of the first computing node according to a respective memory access criterion;

in response to receiving, from the second computing node using the interconnect, a data packet that includes a request to access the memory of the first computing node, selecting, for servicing the request, a pool of resources that is either (a) the pool of resources for a respective memory access criterion that is satisfied by the request, or (b) a default pool of resources; and when the selected pool includes resources sufficient to service the request, servicing the request using those resources.

13. The method according to claim 12, wherein at least one memory access criterion is a combination of one or more of the group consisting of: a memory address range assigned to either the first storage device or the second storage device, a type of request, a relationship between the first computing node and the second computing node, and a configuration of the second computing node.

14. The method according to claim 13, wherein the at least one memory access criterion refers to a memory address range, and the criterion is satisfied by the request when a memory address contained in the request is within the memory address range.

15. The method according to claim 13, wherein the at least one memory access criterion refers to a type of request, and the criterion is satisfied by the request when the type of request is one of the group consisting of: a coherent data read, a coherent data write-back, a non-coherent data read, a non-coherent data write, a data snoop, an ownership request, a metadata access, and a configuration operation.

16. The method according to claim 13, wherein the at least one memory access criterion refers to a relationship between the first computing node and the second computing node, and the criterion is satisfied by the request when the first computing node or the interconnect determines that the second computing node has permission to access the memory of the first computing node.

17. The method according to claim 13, wherein the at least one memory access criterion refers to a configuration of the second computing node, and the criterion is satisfied by the request when the request includes an indication that the second computing node is configured to access memory having varying latencies.

18. The method according to claim 12, further comprising, when the selected pool does not include resources sufficient to service the request:

when the request must be immediately processed, transmitting a NACK message to the second computing node via the interconnect.

19. The method according to claim 18, further comprising, when the selected pool does not include resources sufficient to service the request and the request need not be immediately processed:

when a request queue for the selected pool is not full, (a) queuing the request in the request queue until the selected pool includes sufficient resources, and (b) when the selected pool includes sufficient resources, removing the request from the request queue and servicing the request.

20. The method according to claim 19, further comprising, when the selected pool does not include resources sufficient to service the request, the request need not be immediately processed, and the request queue is full:

transmitting a NACK message to the second computing node via the interconnect.

21. The method according to claim 12, wherein the plurality of resources includes, within the interconnect, computing resources, one or more virtual channels, or one or more data buffers.

22. A non-transitory storage medium in which is stored program code that, when executed by a computer processor in a first computing node of a high-performance computing (HPC) system having a plurality of computing nodes, the first computing node being coupled to a second computing node in the plurality of computing nodes via an interconnect, causes the first computing node to perform a method of managing accesses to a memory of the first computing node, the memory consisting of a plurality of storage devices, each such storage device having a different access latency, the method comprising:

allocating resources of the first and second computing nodes and the interconnect into a plurality of pools of resources, each such pool containing sufficient resources to service a respective number of pending requests to access the memory of the first computing node according to a respective memory access criterion;

in response to receiving, from the second computing node using the interconnect, a data packet that includes a request to access the memory of the first computing node, selecting, for servicing the request, a pool of resources that is either (a) the pool of resources for a respective memory access criterion that is satisfied by the request, or (b) a default pool of resources; and when the selected pool includes resources sufficient to service the request, servicing the request using those resources.

23. The storage medium according to claim 22, wherein at least one memory access criterion is a combination of one or more of the group consisting of: a memory address range assigned to either the first storage device or the second storage device, a type of request, a relationship between the first computing node and the second computing node, and a configuration of the second computing node.

24. The storage medium according to claim 23, wherein the at least one memory access criterion refers to a memory address range, and the criterion is satisfied by the request when a memory address contained in the request is within the memory address range.

25. The storage medium according to claim 23, wherein the at least one memory access criterion refers to a type of request, and the criterion is satisfied by the request when the type of request is one of the group consisting of: a coherent data read, a coherent data write-back, a non-coherent data read, a non-coherent data write, a data snoop, an ownership request, a metadata access, and a configuration operation.

26. The storage medium according to claim 23, wherein the at least one memory access criterion refers to a relationship between the first computing node and the second computing node, and the criterion is satisfied by the request when the first computing node determines that the second computing node has permission to access the memory.

27. The storage medium according to claim 23, wherein the at least one memory access criterion refers to a configuration of the second computing node, and the criterion is satisfied by the request when the request includes an indication that the second computing node is configured to access memory having varying latencies.

28. The storage medium according to claim 22, further comprising program code for, when the selected pool does not include resources sufficient to service the request: when the request must be immediately processed, transmitting a NACK message to the second computing node via the interconnect.

29. The storage medium according to claim 28, further comprising program code for, when the selected pool does not include resources sufficient to service the request and the request need not be immediately processed:

when a request queue for the selected pool is not full, (a) queuing the request in the request queue until the selected pool includes sufficient resources, and (b) when the selected pool includes sufficient resources, removing the request from the request queue and servicing the request.

30. The storage medium according to claim 29, further comprising program code for, when the selected pool does not include resources sufficient to service the request, the request need not be immediately processed, and the request queue is full:

transmitting a NACK message to the second computing node via the interconnect.

31. The storage medium according to claim 22, wherein the plurality of resources includes a virtual channel on the interconnect between the first computing node and the second computing node.

* * * * *